United States Patent [19]

Hinton et al.

[11] Patent Number: 4,978,842

[45] Date of Patent: Dec. 18, 1990

[54] PROGRAMMABLE OPTICAL LOGIC DEVICE WITH COMPLEMENTARY INPUTS

[75] Inventors: Harvard S. Hinton, Naperville; Anthony L. Lentine, St. Charles, both of Ill.; David A. B. Miller, Fair Haven, N.J.

[73] Assignee: AT&T Bell Laboratories, Murray Hill, N.J.

[21] Appl. No.: 341,524

[22] Filed: Apr. 21, 1989

[51] Int. Cl.⁵ .............................................. H01J 31/50
[52] U.S. Cl. ................................ 250/213 A; 377/102
[58] Field of Search ..................... 250/213 A, 211 J; 377/102

[56] References Cited

U.S. PATENT DOCUMENTS

| | | | |
|---|---|---|---|
| 4,546,244 | 10/1985 | Miller . | |
| 4,751,378 | 6/1988 | Hinton et al. . | |
| 4,754,132 | 6/1988 | Hinton et al. . | |
| 4,820,915 | 4/1989 | Hamakawa et al. | 250/211 J |
| 4,822,992 | 4/1989 | Bar-Joseph et al. | 250/211 J |

OTHER PUBLICATIONS

D. A. B. Miller et al., Appl. Phys. Lett., vol. 45, No. 1, Jul. 1, 1984, "Novel Hybrid Optically Biastable Switch: . . .", pp. 13–15.
S. D. Smith, Applied Optics, vol. 25, No. 10, May 15, 1986, "Optical Bistability, Photonic Logic, . . .", pp. 1550–1564.
A. L. Lentine et al., Conf. Laser Electro-Optics, Post-deadline Paper No. ThT12–"The Symmetric Self Electro-Optic . . .", pp. 249–250, 1987.
A. L. Lentine et al., Appl. Phys. Lett., vol. 52, No. 17, Apr. 25, 1988, "Symmetric Self-Electro-Optic . . .", pp. 1419–1421.
A. L. Lentine et al., Conf. Lasers & Electro-Optics, Apr. 1988, "Photonic Ring Counter . . .".
H. S. Hinton, IEEE J. on Selected Areas in Comm., vol. 6, No. 7, Aug. 1988, "Architectural Considerations . . .", pp. 1209–1226.

Primary Examiner—David C. Nelms
Assistant Examiner—Que Tan Le
Attorney, Agent, or Firm—Gregory C. Ranieri

[57] ABSTRACT

Boolean logic functions are provided in a programmable optical logic device by combining a symmetric self-electrooptic effect device (S-SEED) with a logic control element for optically programming the S-SEED to initiate logic operations from a predetermined state. The predetermined preset state together with subsequent application of optical data signals to the S-SEED permit the desired logic operation to be performed on the optical data signal by the optical logic device. Logic operations which may be programmed into the optical logic device include AND, NAND, OR and NOR functions. A complementary pair (Q and $\overline{Q}$) of optical signals is provided as output from each optical logic device.

5 Claims, 2 Drawing Sheets

| INPUTS | | | | PRESETS | | OUTPUTS | |
| A | | B | | | | | |
| X | Y | $\overline{X}$ | $\overline{Y}$ | a | b | Q | $\overline{Q}$ |
|---|---|---|---|---|---|---|---|
| 0 | 0 | 1 | 1 | 0 | 1 | 0 | 1 |
| 0 | 1 | 1 | 0 | 0 | 1 | 0 | 1 |
| 1 | 0 | 0 | 1 | 0 | 1 | 0 | 1 |
| 1 | 1 | 0 | 0 | 0 | 1 | 1 | 0 |
| 0 | 0 | 1 | 1 | 1 | 0 | 0 | 1 |
| 0 | 1 | 1 | 0 | 1 | 0 | 1 | 0 |
| 1 | 0 | 0 | 1 | 1 | 0 | 1 | 0 |
| 1 | 1 | 0 | 0 | 1 | 0 | 1 | 0 |

Rows 1–4: AND / NAND
Rows 5–8: OR / NOR

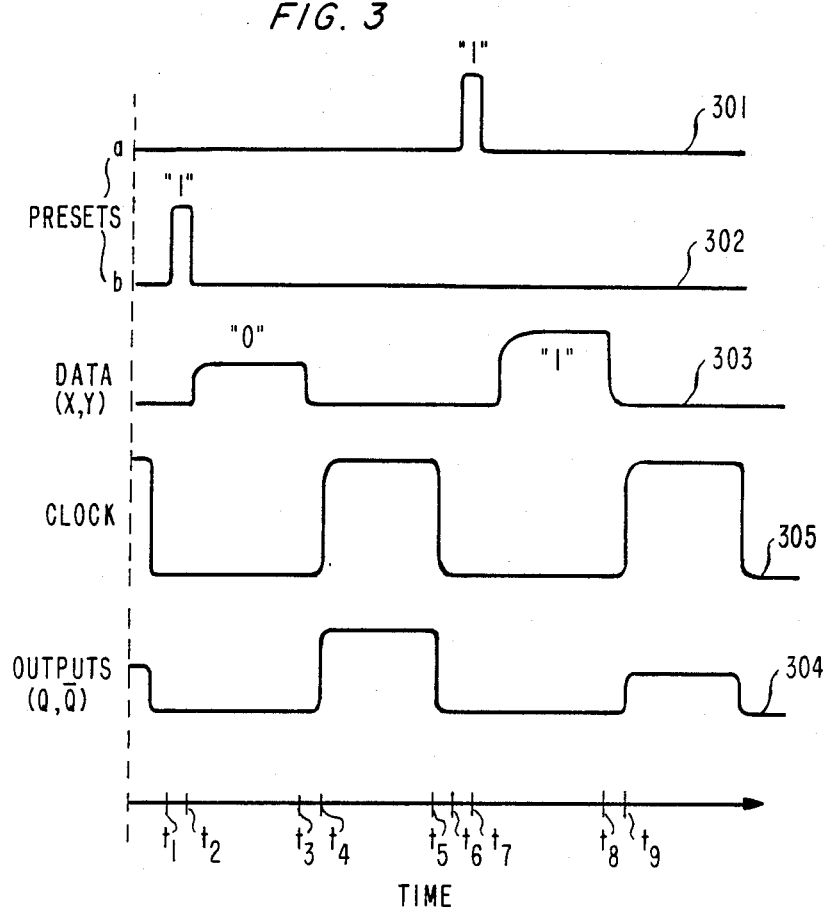

PROGRAMMABLE OPTICAL LOGIC DEVICE WITH COMPLEMENTARY INPUTS

TECHNICAL FIELD

This invention relates to lightwave device and, more particularly, to photonic semiconductor devices including self-electrooptic effect devices.

BACKGROUND OF THE INVENTION

Computing, communications, switching and interconnection are technical fields which have demonstrated both applicability and need for optics and optical devices. In these technical fields, one class of device which is needed is an optical logic device. For the optical logic device, data or information carrying signals incident on the device control the state of the device in such a way that some Boolean function or combination of Boolean functions is peformed on the incident signals.

Nonlinear Fabry-Perot etalons have been suggested as all-optical devices which can provide optical logic functions. See S. D. Smith, *Applied Optics*, Vol. 25, No. 10, pp. 1150-64 (1986) and H. S. Hinton, *IEEE Journal on Selected Areas in Communications*, Vol. 6, No. 7, pp. 1209-26 (1988). One drawback to the use of nonlinear Fabry-Perot etalons in high speed operation is that incident controlling signals such as clock and data signals must be separated in wavelength so that one wavelength correponds to an absorption peak of the nonlinear material in the etalon. Such a limitation is necessary to permit switching or tuning the nonlinear Fabry-Perot etalon between transmissive and reflective states. As a result of this method of operation, the input wavelength is different from the output wavelength thereby excluding the possibility of cascading these devices one after the other. While required wavelength difference pose significant limitations, it cannot be avoided that other limitations arise because temperature variations cause the etalon to undergo changes with respect to location of resonance peaks for the cavity. In turn, the etalon may or may not be responsive to input optical signals. Moreover, intensity variations of the incident signals can cause the nonlinear Fabry-Perot etalon to change state in a haphazard manner of not at all.

SUMMARY OF THE INVENTION

Boolean logic functions are provided in a programmable optical logic device by combining a symmetric self-electrooptic effect device (S-SEED) with a logic control element for optically programming the S-SEED to initiate logic operations from a predetermined state. The predetermined preset state together with subsequent application of optical data signals to the S-SEED permits the desired logic operation to be performed on the optical data signals by the optical logic device. Logic operations which may be programmed into the optical logic device include AND, NAND, OR and NOR functions. A complementary pair (Q and $\bar{Q}$) of optical signals is provided as output from each optical logic device.

In accordance with the principles of the invention, the programmable optical logic device based on the S-SEED permits all optical signals to be at the same wavelength. Accordingly, the programmable optical logic device is readily cascadable.

According to another aspect of the invention, the programmable optical logic device is substantially immune to intensity variations of the optical signals because the S-SEED provides switching in accordance with the ratio of input powers not the absolute intensity of the input optical signals.

Accoridng to yet another aspect of the invention, the programmable optical logic device is capable of being integrated with other devices including other optical logic devices in large arrays on the order of 100 $\times$ 100 using standard modest fabrication techniques.

According to still another aspect of the invention, the programmable optical logic device may be operated over a wide range of wavelengths covering several nanometers whereas the nonlinear Fabry-Perot etalon devices are operable over an extremely narrow range of only several angstroms.

BRIED DESCRIPTION OF THE DRAWING

A more complete understanding of the invention may be obtained by reading the following description of a specific illustrative embodiment of the invention in conjunction with the appended drawing in which:

FIG. 3 shows an exemplary timing diagram for input and output signals for the device in FIG. 1.

DETAILED DESCRIPTION

Figures 1, 2:
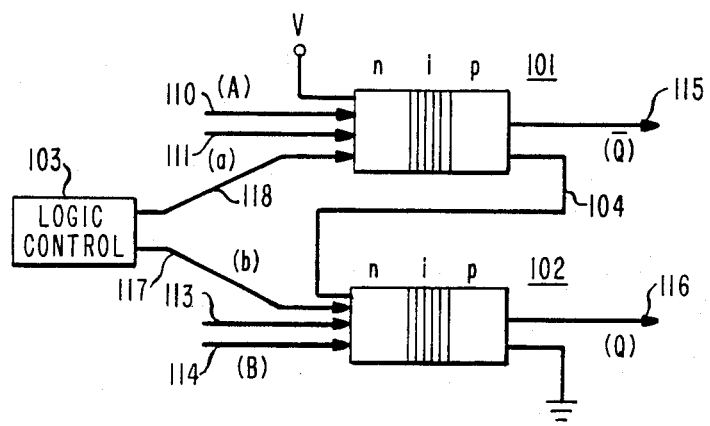
FIG. 1 depicts an embodiment of a programmable optical logic device in accordance with the principles of the invention.
FIG. 2 shows a truth table related to operation of the device in FIG. 1.

The self-electrooptic effect device (SEED), the symmetric self-electrooptic effect device (S-SEED), and the fabrication techniques applicable to both have been fully described in U.S. Pat. Re. Nos. 32,893; 4,546,244; 4,751,378; and 4,754,132 as well as in the following technical references: D. A. B. Miller et al., *Appl. Phys. Lett.*, 45(1), pp. 13-15 (1984) and A. . Lentine et al., *Appl. Phys. Lett.*, 52(17), pp. 1419-21 (1988). The references cited above and their teachings are expressly incorporated herein by reference.

The S-SEED is a four port device having an least two inputs and two outputs as shown in FIG. 1. This device is formed by electrically interconnecting multiple quantum well p-i-n diode 101 in series with multiple quantum well p-i-n diode 102 via lead 104. The diodes are subject to a reverse bias potential, V. When the diodes are connected in this manner, they provide complementary outputs (Q and $\bar{Q}$) because one of the diodes is on when the other is off. More precisely, it is understood that one of the diodes is in an absorbing state when the other diode is in a transmissive state. State changes for the S-SEED are known to occur as a function of the ratio of the powers of the inputs signals and not as a function of the absolute intensity of the input signal. A state change is observed from outputs changing levels such as Q changing from 0 to 1 or vice versa.

In operation, optical signal beams 110, 111, 113, and 114 are incident on the S-SEED. The optical signal beams are grouped to be incident on the specific diodes as follows: optical signal beams 110 and 111 representing data A and the clock signals, respectively, are incident on diode 101 and optical signal beams 113 and 114 representing the clock signal and data signal B are incident on diode 102. Optical signal beams 110 and 114 can effect a change of output state of the S-SEED. The amplitude of these optical signal beams is choses to have suficient contrast between a signal 0 and a logical 1 level to insure that the S-SEED is not forced into a bistable region wherein the output level is ambiguous. An exemplary contrast of 2:1 has been found to satisfy the above criteria. It is understood that the optical signal beams corresponding to the clock signals have substantially equal intensities which are intially low when to the data signal intensities. Since the output state of the S-SEED is determined by the ratio of the incident signal powers on the diodes, the presence of a clock signal simultaneously with the data signals tends to degrade the constrast ratio of the input beams possible resulting in the failure of the S-SEED to switch states. While it is understood that the clock signals are generally applied to read out the state of the S-SEED via complementary output signal beams 115 and 116 ($\overline{Q}$ and Q, respectively), it is desirable to maintain a relatively small difference between the intensities of optical signal beams 111 and 113 as well as a sufficient intensity so that the state of the S-SEED is read without interference or alteration. For most S-SEED, it has a been determined that a ratio of powers for data signal A to data signal B exceeding 1.3 or falling below 0.7 causes switching of the S-SEED wherein it is understood that the optical hysteresis loop is centered about a point where the powers of both data signals are substantially equal.

To understand the programmable optical logic device, it is necessary to explain that FIG. 1 has been simplified to permit the description of the basic S-SEED given above. Optical signal beams 110 and 114 individually comprise the data signals on which the Boolean functions are to be performed. See, for example, FIGS. 2 and 3. As shown, optical signal beam 110 includes the combination of individual data signals X and Y whereas optical signal beam 114 includes the combination of the complements of the individual data signals $\overline{X}$ and $\overline{Y}$. When performing a Boolean function, the programmable optical logic device performs it on the individual data signals X and Y as combined to form signal A or on complementary individual data signals $\overline{X}$ and $\overline{Y}$ as combined to form signal B. That is, the programmable optical logic device performs an AND function as $f(X,Y)=X \cdot Y$ and an OR function as $f(X,Y)=X+Y$.

As shown in FIG. 1, the embodiment of the present invention also includes logic control 103 in combination with the S-SEED which comprises series connected multiple quantum well p-i-n diodes. Logic control 103 generates complementary optical signal beams 117 and 118 for presetting the S-SEED to operate deterministically through the bistable region for the basic S-SEED so that ambiguities are eliminated and so that the device may perform various Boolean functions on command. In FIG. 1, optical signal beam 118 from logic control 103 is directed to be incident on diode 101 and optical signal beam 117 from logic control 103 is directed to be incident on diode 102. In an alternative embodiment, logic control 103 generates only one of the optical signal beams 117 and 118 at a time. In the latter embodiment, one preset beam would be off while the other beam would be on.

Logic control 103 through its application of complementary optical signal beams 117 and 118 (preset signal a and b) causes the S-SEED to respond to subsequent data signals as either an AND/NAND gate or an OR/NOR gate. Logic control 103 effectively programs a particular Boolean function so that the entire combination of the S-SEED and logic control 103 acts as a programmable optical logic device according to the desire Boolean function rules.

In order to understand the programmable operation of this device, attention should be directed to FIGS. 2 and 3. A description of the operation for noninverting logic functions, AND and OR, follows below.

For a Boolean AND operation, preset signal b (optical beam 117) is generated at a high level by logic control 103. This results in diode 102 becoming highly absorbing which causes the data signal B ($\overline{X}$, $\overline{Y}$) to be absorbed by diode 102 causing, in turn, output optical signal beam 116 to be in a low state (Q=0) relative to output optical signal beam 115 which is set to a high state ($\overline{Q}$=1) because diode 101 is highly transmissive for data signal A (X,Y). Preset signal b is generated as a pulse to impinge on diode 102 for a short time period preceding the arrival of the data signals. The wavelength, duration and intensity of the preset signal is determined to permit sufficient energy transfer to diodes 101 and 102 for establishing an initial output state for the diode pair. While staggering of the preset and data signals is preferred, it is understood that the preset signal may be applied concurrent with the leading edge of the data signals.

When X and Y are at a zero level, $\overline{X}$ and $\overline{Y}$ are both at a one level so that the diode pair remains in the preset condition with Q=0. When either X or Y is at one lever, $\overline{X}$ or $\overline{Y}$ is at a one level so that data signal A and B are substantially equal causing the diode pair to remain in the state set by preset signal b wherein Q=0. Finally when X and Y are at a one lever, $\overline{X}$ and $\overline{Y}$ are both in the zero state causing the diode pair to switch from the preset state to a state where Q=1. Thus, the Boolean AND function is achieved by proper use of presetting as developed by logic control 103.

For a Boolean OR operation, preset signal a (optical beam 118) is generated at a high level by logic control 103. This result in diode 101 becoming highly absorbing which causes the data signal A(X,Y) to be absorbed by diode 101 causing, in turn, output optical signal beam 116 to be in a high state (Q=1) relative to output optical signal beam 115 which is set to a high state ($\overline{Q}$=0) because diode 102 is highly transmissive for data signal b ($\overline{X}$, $\overline{Y}$). Preset signal a is generated as a pulse to impinge on diode 101 for a short time period preceding the arrival of the data signals.

When X and Y are at a zero level, $\overline{X}$ and $\overline{Y}$ are both in the one state causing the diode pair to switch from the preset state to a state where Q=0. When either X or Y is at a one level, $\overline{X}$ or $\overline{Y}$ is also at a one level so that data signals A and B are substantially equal causing the diode pair to remain in the state set by preset signal b wherein Q=1. Finally when X and Y are at one lever, $\overline{X}$ and $\overline{Y}$ are both at a zero level so that the diode pair remains in the preset condition with Q=1. Thus, the Boolean OR function is achieved by proper use of presetting as developed by logic control 103.

It should be clear to those skilled in the art that the inverting Boolean functions are simultaneously available on the complementary output rail or beam ($\overline{Q}$). That is, when the Q output (output beam 116) is the primary or active rail during an AND or OR operation, the $\overline{Q}$ output (output beam 115) corresponds to a NAND or NOR output, respectively.

As shown in FIG. 3, a preset signal b (beam 117 shown as signal 302) from logic control 103 impinges on diode 102 from time $t_1$ to time $t_2$. This causes the programmable optical logic device to behave as an AND/-

NAND gate based upon which output is active. Data signals X,Y, $\overline{X}$, $\overline{Y}$ (shown individually as exemplary signal 303) impinging on the diodes are ANDed or NANDed together to generate new output signal beams. At time $t_3$, the data signals subside and the clock signals (shown individually as signal 305) are applied to read the outputs beginning at time $t_4$. See exemplary output signals 304. The clock signals are turned off to cease reading at time $t_5$. At time $t_6$, preset signal a (beam 118 shown as signal 301) form logic control 103 impinges on diode 101 from time $t_6$ to time $t_7$. This causes the programmable optical logic device to behave as an OR/NOR gate based upon which output is active. Data signals X,Y, $\overline{X}$, $\overline{Y}$ impinging on the diodes are ORed or NORed together to generate new output signal beams. At time $t_8$, the data signals subside and the clock signal are applied to read the outputs beginning at time $t_g$. See exemplary output signals 304. The clock signals are turned off to cause reading of the OR logic.

In one example for experimental practice, preset signals were generated by a standard acousto-optic modulated HeNe laser at 633 nm using peak power levels from approximately 6 $\mu$W to approximately 100 $\mu$W at a 12.5% duty cycle. Clearly any wavelength that is significantly absorbed by the diodes can be used. In theory, a short pulse from a modelocked laser can be used to preset the S-SEED very quickly provided that the pulse contains sufficient energy. In the particular example cited above, the S-SEED comprises quantum well p-i-n diodes with AlGaAs/GaAs quantum well intrinsic regions (nominally 850 nm). Exemplary data signal levels incident on the logic gate have been estimated at approximately 4.8 $\mu$W and 2.4 $\mu$W for the complementary input beams.

From the description above, it should be clear to those skilled in the art that the programmable optical logic device described herein either may be operated as a dedicated logic gate or may be operated in a programmable mode wherein the logic function perform may vary from time period to time period.

In addition to the benefits described above, other benefits derived from the programmable optical logic device are time sequential gain without critical biasing, high gain (low power in vs. high power out), and large fanout.

While the presetting function has been shown to be performed primarily with optical signals, it should be clear now to those skilled in the art that electrical signals may be used to preset the diode pair to an initial state. For example, a source potential V or ground potential may be switchably applied to lead 104. Application of source potential V would cause diode 102 to become highly absorbent whereas application of the ground potential would cause diode 101 to become highly absorbent.

It should also be noted that an alternative embodiment of the diode pair is contemplated herein. For example, either diode 101 or diode 102 may be replaced by a standard p-i-n diode which does not employ a quantum well intrinsic region. As such, the remaining diode would be required to be a quantum well p-i-n diode so that the resulting arrangement would be a self electro-optic effect device having a p-i-n diode as its load. In such an arrangement, the active output and, in fact, the only output would be derived from the output of the quantum well p-i-n diode.

We claim:

1. Semiconductor apparatus comprising
   a symmetric self-electrooptic effect device including first and second optical input ports and at least a first output port, said device for generating an output lightwave signal at the at least first output port and for changing the output lightwave signal from a first level to a second level when a ratio of powers signals at said first input port to second optical input port exceeds at first threshold, said input lightwave signal at said first port including first and second data signal beams, said input lightwave signal at said second port including complementary representations of said first and second data signal beams, and
   means coupled to said first and second input ports for optically controlling the device to assume an initial state for generating the output lightwave signal at said first level and thereby causing the semiconductor apparatus to perform a Boolean function on subsequent input lightwave signals, said Boolean function chosen from the group consisting of AND, NAND, OR, and NOR.

2. The semiconductor apparatus as defined in claim 1 wherein said optically controlling means includes means for generating a preset signal beam, said present signal beam being supplied to said first input port for presetting said device to generate said output lightwave signal initially at said second level and wherein said device responds to said input lightwave signals for changing the output lightwave signal from said second level to said first level when the radio of powers of signals at said first input port to signals at said second input port is less than a second threshold.

3. The semiconductor apparatus as defined in claim 1 wherein said optically controlling means includes means for generating a preset signal beam, said preset signal beam being supplied to said second input port for presetting said device to generate said output lightwave signal initially at said first level.

4. The semiconductor apparatus as defined in claim 3 wherein said effect device responds to said input lightwave signals for changing the output lightwave signal from said second level to said first level when the ratio of powers of signals at said first input port to signals at said second input port is less than a second threshold.

5. Semiconductor apparatus comprising
   a symmetric self-electrooptic device including first and second optical input ports and first and second output ports, said device for generating an output lightwave signal at the first output port and for changing the output lightwave signal from a first level to a second level when a ratio of powers of signals at said first input port to second optical input ports exceeds a first threshold, said input lightwave signal at said first port including first and second data signal beams, said input lightwave signal at said second port including complementary representations of said first and second data signal beams, and
   means coupled to at least said first input port for optically controlling the device to assume an intial state for generating the output lightwave signal at said first level and thereby causing the seminconductor apparatus to perform a Boolean function on subsequent input lightwave signals, said Boolean function chosen from the group consisting of OR and NOR.

* * * * *